US012035281B2

(12) United States Patent
Cao et al.

(10) Patent No.: US 12,035,281 B2
(45) Date of Patent: Jul. 9, 2024

(54) IMPLICIT BASE STATION IDENTIFICATION FOR REMOTE INTERFERENCE MANAGEMENT

(71) Applicant: QUALCOMM Incorporated, San Diego, CA (US)

(72) Inventors: Yiqing Cao, Beijing (CN); Huilin Xu, Temecula, CA (US); Yuwei Ren, Beijing (CN); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/290,642

(22) PCT Filed: Oct. 31, 2019

(86) PCT No.: PCT/CN2019/114640
§ 371 (c)(1),
(2) Date: Apr. 30, 2021

(87) PCT Pub. No.: WO2020/088574
PCT Pub. Date: May 7, 2020

(65) Prior Publication Data
US 2021/0385795 A1    Dec. 9, 2021

(51) Int. Cl.
*H04W 56/00*      (2009.01)
*H04L 5/00*       (2006.01)
(Continued)

(52) U.S. Cl.
CPC ........... *H04W 72/02* (2013.01); *H04L 5/0051* (2013.01); *H04L 27/2607* (2013.01);
(Continued)

(58) Field of Classification Search
CPC ............... H04W 72/02; H04W 72/541; H04W 72/0446; H04W 72/0466; H04L 5/0051; H04L 27/2607
(Continued)

(56) References Cited

U.S. PATENT DOCUMENTS 5,032,916 A * 7/1991 Matsuura ............... H04N 5/211
348/478
2007/0183386 A1* 8/2007 Muharemovic ......... H04L 5/023
375/150
(Continued)

FOREIGN PATENT DOCUMENTS

CN    102149096 A    8/2011
CN    102833793 A    12/2012
(Continued)

OTHER PUBLICATIONS

"Ke, A Signal Transmission Method And Communication Device, Feb. 21, 2020, CN 110831021" (Year: 2020).*
(Continued)

*Primary Examiner* — Sai Ming Chan
(74) *Attorney, Agent, or Firm* — Sevan Savsa; Harrity & Harrity, LLP

(57) ABSTRACT

Aspects of the present disclosure relate to wireless communication. In aspects, a base station may determine one or more signaling parameters to be used to transmit one or more reference signals that identify the base station in association with remote interference management, wherein the one or more signaling parameters include at least one of: multiple time periods in which the one or more reference signals are to be transmitted; one or more mini-bands, within one or more sub-bands, in which the one or more reference signals are to be transmitted; one or more scrambling codes, selected from a pool of scrambling codes, to be used to scramble the one or more reference signals; or a combina-
(Continued)

tion thereof. The base station may transmit the one or more reference signals using the one or more signaling parameters to identify the base station in association with remote interference management. Other aspects are provided.

30 Claims, 9 Drawing Sheets

(51) Int. Cl.
| | | |
|---|---|---|
| *H04L 27/26* | (2006.01) | |
| *H04W 72/02* | (2009.01) | |
| *H04W 72/044* | (2023.01) | |
| *H04W 72/0446* | (2023.01) | |
| *H04W 72/541* | (2023.01) | |

(52) U.S. Cl.
CPC ... *H04W 72/0446* (2013.01); *H04W 72/0466* (2013.01); *H04W 72/541* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2008/0298502 | A1* | 12/2008 | Xu | H04L 5/0007 |
| | | | | 375/299 |
| 2010/0165935 | A1* | 7/2010 | Cho | H04L 5/0039 |
| | | | | 370/329 |
| 2012/0087427 | A1 | 4/2012 | Noh et al. | |
| 2013/0021929 | A1* | 1/2013 | Kim | H04W 76/15 |
| | | | | 370/332 |
| 2015/0271003 | A1* | 9/2015 | Kuchi | H04L 1/0656 |
| | | | | 370/329 |
| 2018/0176953 | A1 | 6/2018 | Hampel et al. | |
| 2019/0334676 | A1* | 10/2019 | Liu | H04W 24/00 |
| 2019/0363843 | A1* | 11/2019 | Gordaychik | H04L 1/08 |
| 2021/0152303 | A1* | 5/2021 | Hao | H04L 5/0094 |

FOREIGN PATENT DOCUMENTS

| | | |
|---|---|---|
| CN | 106535250 A | 3/2017 |
| WO | 2009021405 A1 | 2/2009 |

OTHER PUBLICATIONS

"Liu, A Far-end Interference Backspace Method And Base Station, Apr. 21, 2020, CN 111049614" (Year: 2020).*
"Zhang, Method, System and Apparatus for Enabling Vehicular Communications, Mar. 7, 2023, CA 3001385" (Year: 2015).*
"Ketchum, Pilots-Signals for Communication System With Set of Imputs and Set of Outputs (MIMO), Mar. 10, 2009, RU 2349042" (Year: 2003).*
International Search Report and Written Opinion—PCT/CN2018/113654—ISA/EPO—dated Jul. 19, 2019.
International Search Report and Written Opinion—PCT/CN2019/114640—ISA/EPO—dated Feb. 1, 2020.
Nokia., et al., "Considerations on Identifying Strong gNB Interferers", 3GPP TSG RAN WG1 Meeting #94bis, R1-1811212, Oct. 12, 2018 (Oct. 12, 2018), 5 Pages, sections 2-3.
Qualcomm Incorporated, "Mechanisms for Identifying Strong gNB Interferers", 3GPP TSG RAN WG1 Meeting #95, R1-1813431, Nov. 16, 2018 (Nov. 16, 2018), pp. 1-6, section 4.
Ericsson: "On Mechanism for Identifying Strong gNB Interferers", 3GPP TSG-RAN WG1 Meeting #94, Tdoc R1-1808823 On Mechanisms for Identifying Strong gNB Interferers, 3rd Generation Partnership Project, Mobile Competence Centre, 650, Route Des Lucioles, F-06921 Sophia-Antipolis CE, vol. RAN WG1, No. Goteborg, Sweden, Aug. 20, 2018-Aug. 24, 2018, Aug. 10, 2018, XP051516196, 6 Pages.
Supplementary European Search Report—EP19879474—Search Authority—The Hague—dated Jun. 10, 2022.
ZTE: "Consideration on Mechanism for Identifying Strong gNB Interference", R1-1810332, 3GPP TSG RAN WG1 Meeting #94bis, 3rd Generation Partnership Project, Mobile Competence Centre, 650, Route Des Lucioles, F-06921, vol. RAN WG1, No. Chengdu, China, Oct. 8, 2018-Oct. 12, 2018, Sep. 29, 2018, XP051517744, 6 Pages.

* cited by examiner

IMPLICIT BASE STATION IDENTIFICATION FOR REMOTE INTERFERENCE MANAGEMENT

CROSS-REFERENCE TO RELATED APPLICATIONS

This application is a 371 national stage of PCT Application No. PCT/CN2019/114640 filed on Oct. 31, 2019, entitled "IMPLICIT BASE STATION INDENTIFICATION FOR REMOTE INTERFERENCE MANAGEMENT," which claims priority to Patent Cooperation Treaty (PCT) Application No. PCT/CN2018/113654, filed on Nov. 2, 2018, entitled "IMPLICIT BASE STATION IDENTIFICATION FOR REMOTE INTERFERENCE MANAGEMENT," which are hereby expressly incorporated by reference herein.

FIELD OF THE DISCLOSURE

Aspects of the present disclosure generally relate to wireless communication and to techniques and apparatuses for implicit base station identification for remote interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining one or more signaling parameters to be used to transmit one or more reference signals that identify the base station in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof; and transmitting the one or more reference signals using the one or more signaling parameters to identify the base station in association with remote interference management.

In some aspects, a base station for wireless communication may include memory and one or more processors operatively coupled to the memory. The memory and the one or more processors may be configured to determine one or more signaling parameters to be used to transmit one or more reference signals that identify the base station in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof; and transmit the one or more reference signals using the one or more signaling parameters to identify the base station in association with remote interference management.

In some aspects, a non-transitory computer-readable medium may store one or more instructions for wireless communication. The one or more instructions, when executed by one or more processors of a base station, may cause the one or more processors to determine one or more signaling parameters to be used to transmit one or more reference signals that identify the base station in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof; and transmit the one or more reference signals using the one or more signaling parameters to identify the base station in association with remote interference management.

In some aspects, an apparatus for wireless communication may include means for determining one or more signaling parameters to be used to transmit one or more reference signals that identify the apparatus in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof; and means for transmitting the one or more reference signals using the one or more signaling parameters to identify the apparatus in association with remote interference management.

In some aspects, a method of wireless communication, performed by a base station (e.g., a receiving base station), may include receiving one or more reference signals from a transmitting base station, wherein the one or more reference signals are associated with remote interference management; determining a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof; and performing remote interference management based at least in part on the base station identifier.

In some aspects, a base station (e.g., a receiving base station) for wireless communication may include memory and one or more processors operatively coupled to the memory. The memory and the one or more processors may be configured to receive one or more reference signals from a transmitting base station, wherein the one or more reference signals are associated with remote interference management; determine a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof; and perform remote interference management based at least in part on the base station identifier.

In some aspects, a non-transitory computer-readable medium may store one or more instructions for wireless communication. The one or more instructions, when executed by one or more processors of a base station (e.g., a receiving base station), may cause the one or more processors to receive one or more reference signals from a transmitting base station, wherein the one or more reference signals are associated with remote interference management; determine a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof; and perform remote interference management based at least in part on the base station identifier.

In some aspects, an apparatus for wireless communication may include means for receiving one or more reference signals from a transmitting base station, wherein the one or more reference signals are associated with remote interference management; means for determining a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof; and means for performing remote interference management based at least in part on the base station identifier.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
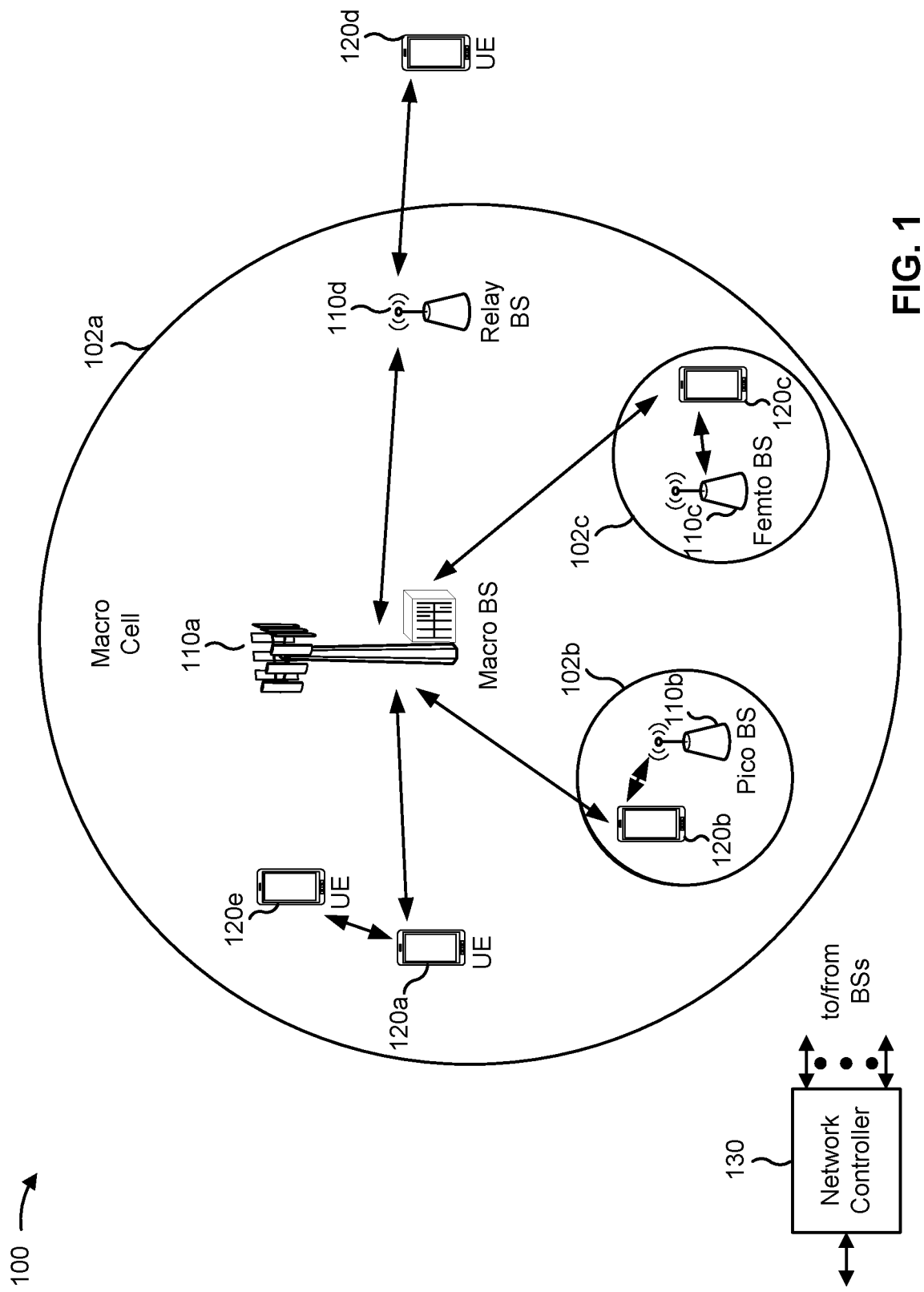
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
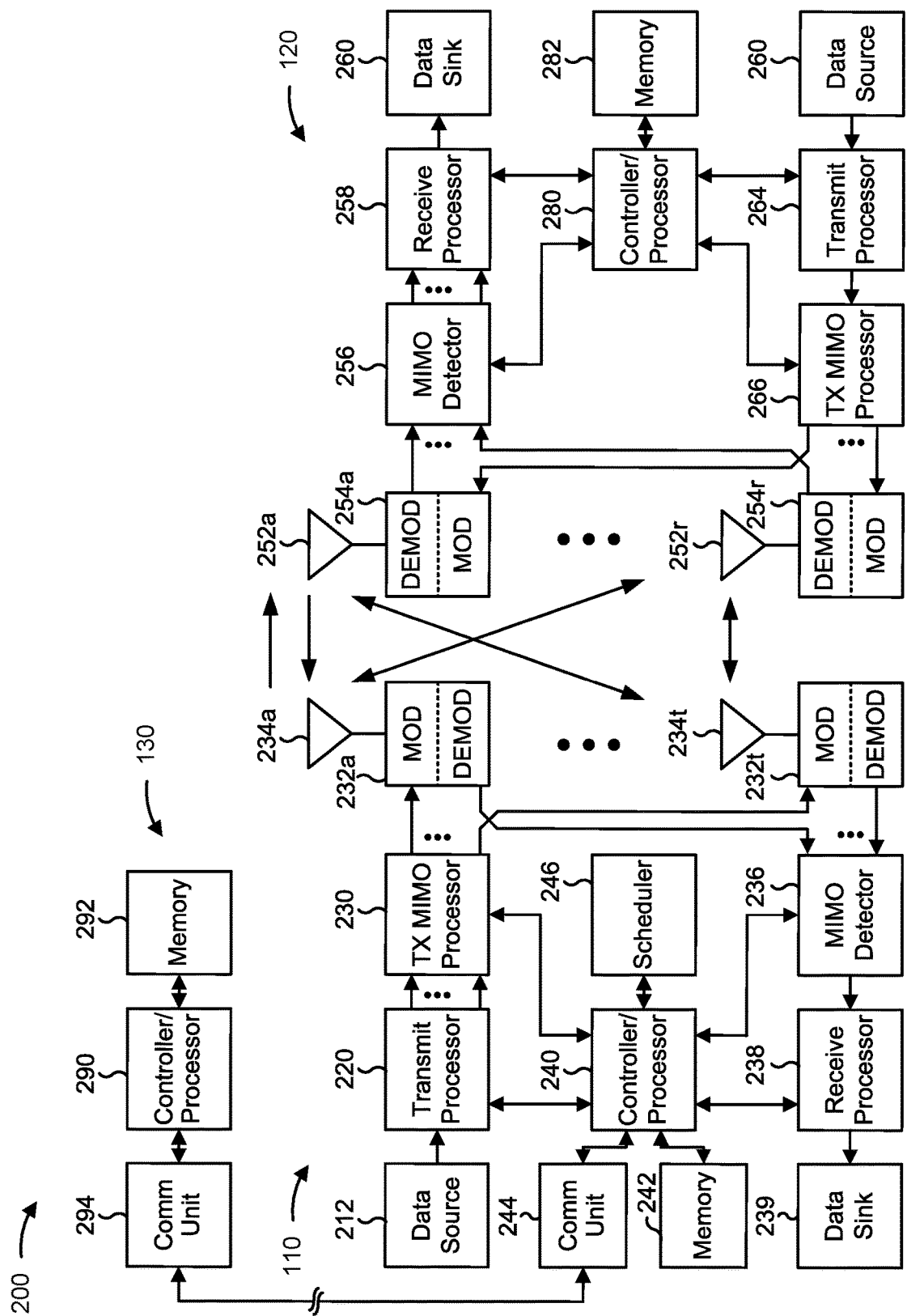
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with implicit base station identification for remote interference management, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining one or more signaling parameters to be used to transmit one or more reference signals that identify the base station 110 in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof; means for transmitting the one or more reference signals using the one or more signaling parameters to identify the base station 110 in association with remote interference management; and/or the like. Additionally, or alternatively, base station 110 may include means for receiving one or more reference signals from a transmitting base station, wherein the one or more reference signals are associated with remote interference management; means for determining a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof; means for performing remote interference management based at least in part on the base station identifier; and/or the like. In some aspects, such means may include one or more components of base station 110 described in connection with FIG. 2.

As indicated above, FIG. 2 is provided merely as an example. Other examples may differ from what was described with regard to FIG. 2.

Figure 3:
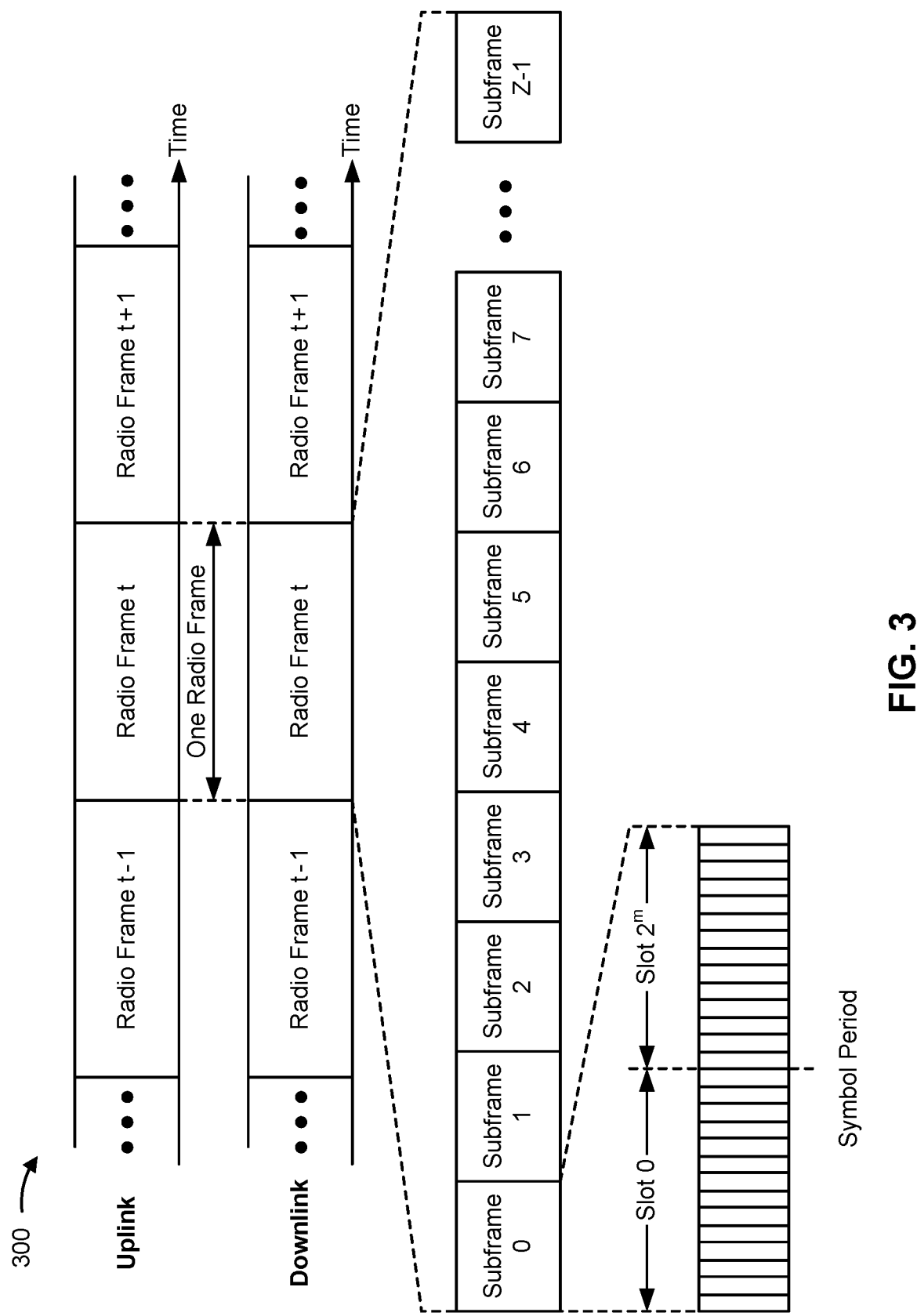
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit may be frame-based, subframe-based, slot-based, mini-slot based, symbol-based, and/or the like.

While some techniques are described herein in connection with frames, subframes, slots, min-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or TTI may refer to a periodic time-bounded communication unit defined by a wireless communication standard and/or protocol. Additionally, or alternatively, different configurations of wireless communication structures and/or TTIs than those shown in FIG. 3 may be used.

As indicated above, FIG. 3 is provided as an example. Other examples may differ from what was described with regard to FIG. 3.

Figure 4:
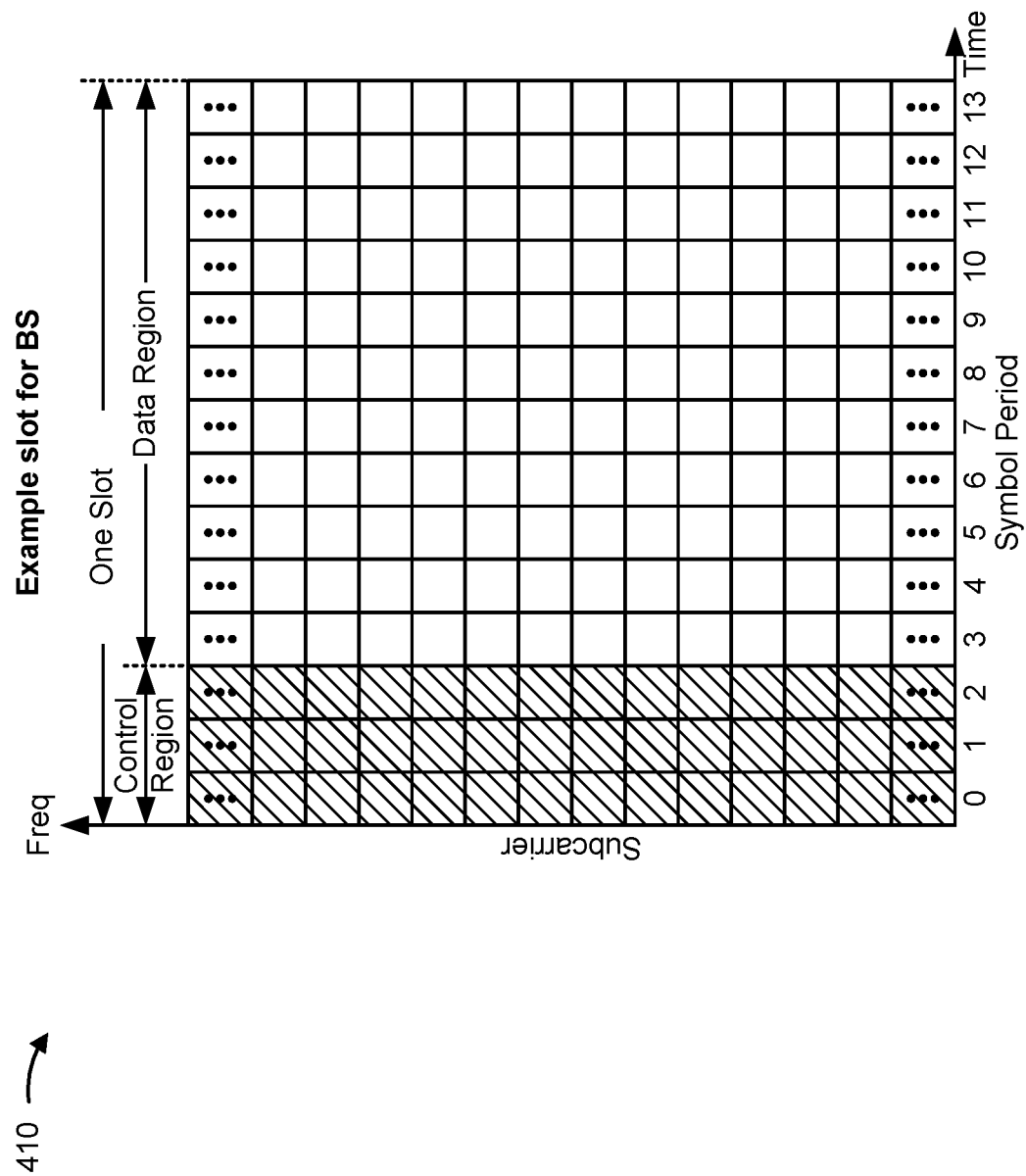
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of to of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
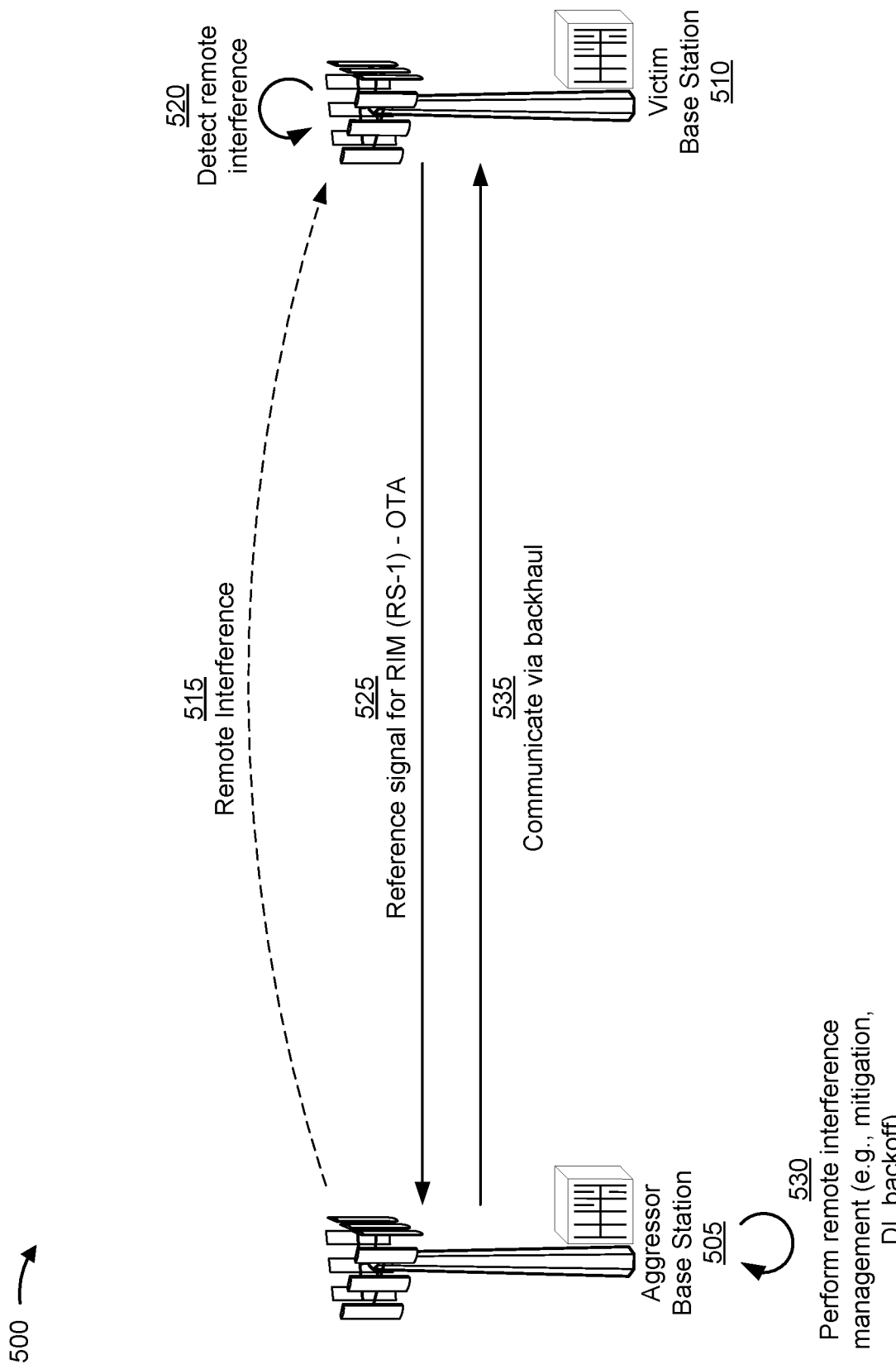
FIG. 5 is a diagram illustrating an example framework for remote interference management, in accordance with various aspects of the present disclosure.

FIG. 5 is a diagram illustrating an example framework 500 for remote interference management, in accordance with various aspects of the present disclosure.

As shown in FIG. 5, framework 500 may include an aggressor base station 505 and a victim base station 510. As shown by reference number 515, the aggressor base station 505 may cause remote interference at the victim base station 510. Remote interference may be caused by an atmospheric ducting phenomenon, where radio signals tend to follow the curvature of the Earth and are propagated over long distances in bands that would normally be limited to line of sight. Remote interference may occur between base stations (e.g., aggressor base station 505 and victim base station 510) that are far away from one another, such as base stations that are not neighbors of one another, base stations that are 100 kilometers apart or more (e.g., usually between 100 and 300 kilometers apart), and/or the like. In some aspects, remote interference may refer to downlink communications of the aggressor base station 505 interfering with uplink communications of the victim base station 510. Framework 500 may be used to assist with remote interference management, which may mitigate the effects of remote interference.

As shown by reference number 520, the victim base station 510 may detect remote interference. For example, the victim base station 510 may determine that a level of interference over thermal (e.g., a strength of interference compared to thermal noise) satisfies a threshold (e.g., is greater than or equal to a threshold interference over thermal level). In some aspects, the victim base station 510 may detect the remote interference in uplink communications of the victim base station 510.

As shown by reference number 525, the victim base station 510 may transmit a reference signal over the air (e.g., via an air interface) to assist with remote interference management (RIM). This reference signal (RS) transmitted by the victim base station 510 may be referred to as RS-1. This reference signal may be transmitted such that the reference signal can be received by the aggressor base station 505 to notify the aggressor base station 505 that the aggressor base station 505 is causing remote interference (e.g., to the victim base station 510).

As shown by reference number 530, based at least in part on receiving the reference signal, the aggressor base station 505 may perform remote interference management. For example, the aggressor base station 505 may perform one or more operations to mitigate remote interference, such as downlink backoff (e.g., blanking one or more downlink resource blocks) and/or the like.

As shown by reference number 535, in framework 500, the aggressor base station 505 may communicate with the victim base station 510 via a backhaul (e.g., including one or more wired connections, via a network controller, via a core network, and/or the like) to assist with remote interference management. To permit such backhaul communication, the aggressor base station 505 may need to determine a base station identifier of the victim base station 510 (e.g., to direct communications to the victim base station 510). Thus, the victim base station 510 may need to identify itself in the reference signal (RS-1). Additionally, or alternatively, in some frameworks for remote interference management, the aggressor base station 505 may transmit a reference signal for remote interference management, referred to as RS-2. In some aspects, the aggressor base station 505 may need to identify itself in such a reference signal (e.g., RS-2).

Because remote interference management occurs over long distances, a large number of base station identifiers may be needed to differentiate between different base stations. For example, there may be hundreds, thousands, tens of thousands, hundreds of thousands, millions, or more base stations in a large geographic area associated with remote interference, including macro base stations, micro base stations, femto base stations, pico base stations, and/or the like. Explicitly indicating a base station identifier in reference signals for RIM (e.g., RS-1, RS-2, and/or the like) may create large overhead and waste network resources because a large number of bits may need to be reserved to indicate unique base station identifiers for different base stations (e.g., 20 bits for one million unique identifiers). Some techniques and apparatuses described herein use one or more implicit signaling parameters (e.g., in a time domain, a frequency domain, a code domain, and/or the like) to indicate a base station identifier, thereby reducing overhead (e.g., a number of bits) needed to differentiate between a large number of base stations for remote interference management. Additional details are described below.

As indicated above, FIG. 5 is provided as an example. Other examples may differ from what was described with respect to FIG. 5.

Figure 6:
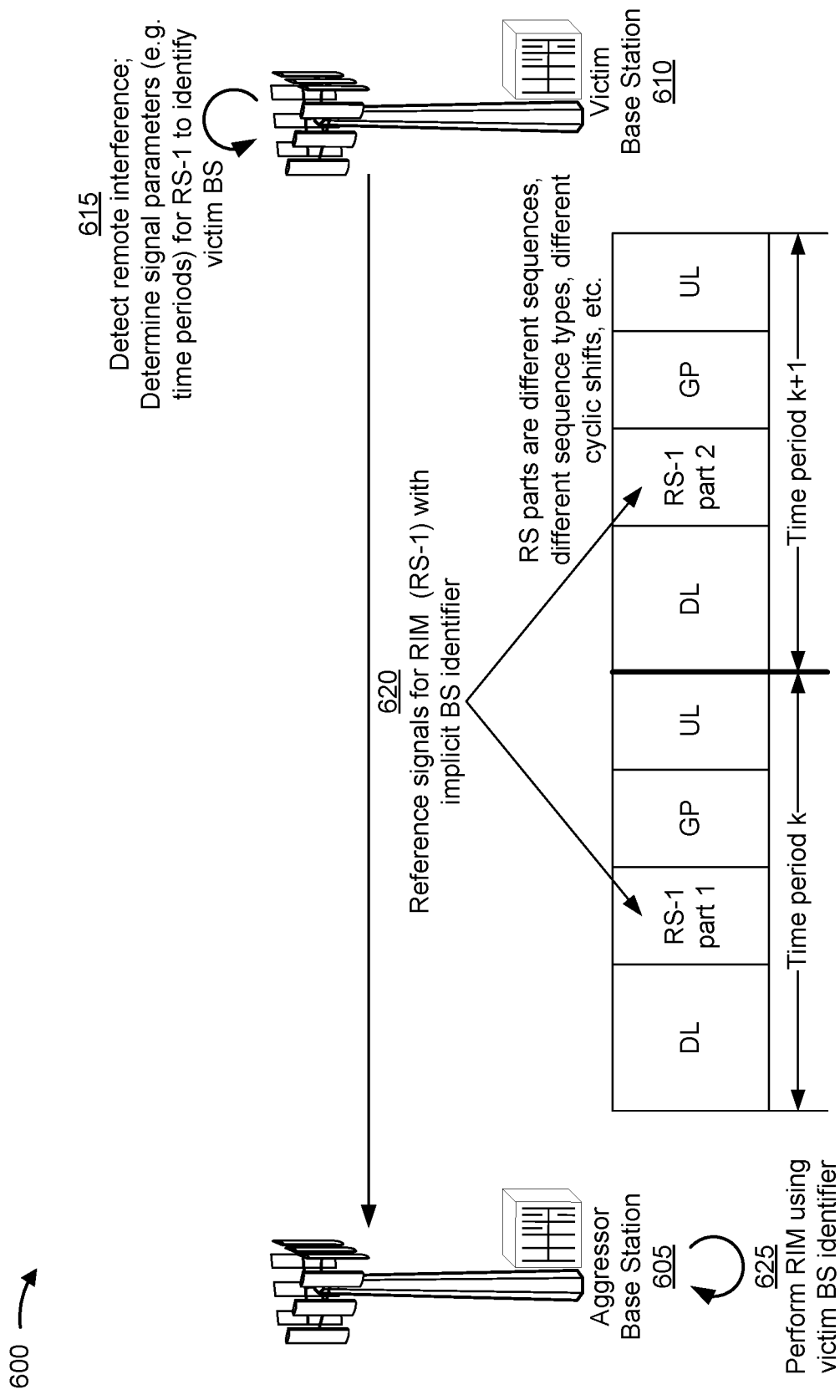
FIGS. 6-7 are diagrams illustrating examples of implicit base station identification for remote interference management, in accordance with various aspects of the present disclosure.

FIG. 6 is a diagram illustrating an example 600 of implicit base station identification for remote interference management, in accordance with various aspects of the present disclosure.

As shown in FIG. 6, example 600 may include an aggressor base station 605 and a victim base station 610. The aggressor base station 605 may cause remote interference at the victim base station 610, as described above in connection with FIG. 5. The aggressor base station 605 and/or the victim base station 610 may include a base station 110.

As shown by reference number 615, the victim base station 610 may detect remote interference, as described above in connection with FIG. 5. Based at least in part on detecting the remote interference, the victim base station 610 may transmit a reference signal for RIM, such as RS-1 and/or the like. The victim base station 610 may transmit the reference signal using one or more signal parameters to indicate (e.g., implicitly) a base station identifier of the victim base station 610. In some aspects, the victim base station 610 may determine the signal parameters based at least in part on a configuration of the victim base station 610 (e.g., a configuration received from a network controller 130, a device in a core network, and/or the like). In some aspects, the one or more signal parameters may include multiple time periods in which the reference signal (e.g., multiple reference signals that together indicate a base station identifier or a portion of the base station identifier) is to be transmitted.

For example, as shown by reference number 620, a first reference signal (e.g., shown as RS-1 part 1) may be transmitted in a first time period (e.g., shown as time period k), and a second reference signal (e.g., shown as RS-1 part 2) may be transmitted in a second time period (e.g., shown as time period k+1). The victim base station 610 may determine the time periods based at least in part on a configuration of the victim base station 610 and/or information stored by the victim base station 610. For example, different base stations 110 may be configured with different time periods to be used for transmission of RIM reference signals (e.g., RS-1, RS-2, and/or the like) so that the RIM reference signals can be used to distinguish between the different base stations 110. For example, a first set of base stations 110 may use a first set of time periods for transmission of RIM reference signals, a second set of base stations 110 may use a second set of time periods for transmission of RIM reference signals, and/or the like.

As shown, in some aspects, multiple RIM reference signals may be transmitted in multiple corresponding time periods. In some aspects, each RIM reference signal may be transmitted in a different time period. In some aspects, the time periods allocated to and/or used by a specific base station 110 may be consecutive (e.g., adjacent, contiguous, and/or the like), as shown in example 600. In some aspects, two or more time periods allocated to and/or used by a specific base station 110 may be non-consecutive (e.g., non-adjacent, non-contiguous, and/or the like). A time period may include, for example, a slot, a mini-slot, a set of symbols (e.g., a set of consecutive symbols), a subframe, a frame, and/or another type of TTI. Additionally, or alternatively, a single time period may include multiple slots, multiple mini-slots, multiple subframes, multiple frames, and/or the like.

In some aspects, different reference signals, transmitted in different time periods, may be transmitted using different sequences. In some aspects, the different sequences may be selected from different sets of sequences. In some aspects, the different sets of sequences may be mutually exclusive (e.g., may not include any of the same sequences) to ensure that different sequences are selected for different reference signals. For example, in example 600, the first reference signal may be transmitted using a first sequence selected from a first set of sequences, and the second reference signal is transmitted using a second sequence selected from a second set of sequences. In some aspects, the first set of sequences and the second set of sequences are mutually exclusive.

By transmitting different sequences for different reference signals, the amount of information that may be implicitly conveyed may be increased as compared to using a single sequence, while reducing decoding complexity and reducing errors (e.g., due to missed sequence detection). For example, if a base station 110 selects a sequence from a pool of 8 sequences, this may permit 3 bits of information to be conveyed using those sequences (e.g., 3 bits representing the 8 options for the sequence), resulting in 8 unique identifiers per reference signal. However, if the base station 110 selects a first sequence from a first pool of 4 sequences, and selects a second sequence from a second pool of 4 different sequences, this may permit 4 bits of information to be conveyed using the same number (e.g., 8) of overall sequences (e.g., 2 bits representing the 4 options for the first sequences and 2 bits representing the 4 options for the second sequence), resulting in 16 unique identifiers per reference signal. In this way, the amount of information that can be conveyed using the same number of sequences may be increased without increasing decoding complexity, or the same amount of information may be conveyed using fewer sequences, thereby reducing decoding complexity and the likelihood of missed detection. Furthermore, since each pool of sequences may include fewer sequences as compared to using a single reference signal to convey the same amount of information, decoding complexity and/or the likelihood of missed detection may be reduced for a specific reference signal and/or time period due to fewer sequence candidates required to be tested for blind decoding.

When multiple reference signals are transmitted over multiple time periods, the aggressor base station 605 may need to determine how to interpret the multiple reference signals so that a base station identifier of the victim base station 610 can be properly identified. For example, the aggressor base station 605 may need to determine which reference signal is a starting reference signal, which reference signal is an ending reference signal, and/or the like, in order to properly identify the multiple reference signals transmitted by the victim base station 610. To achieve this, the victim base station 610 and the aggressor base station 605 may use a common scheme (e.g., a pre-specified scheme indicated in a wireless communication standard, a pre-configured scheme communicated to the base station(s), and/or the like) to differentiate between multiple reference signals transmitted by the victim base station 610.

In some aspects, to differentiate between the multiple reference signals, a first reference signal may be transmitted using a first sequence selected from a first set of sequences, a second reference signal may be transmitted using a second sequence selected from a second set of sequences, and so on. Different sets of sequences (e.g., the first set and the second set, a starting set and one or more other sets, an ending set and one or more other sets, and/or the like) may be mutually exclusive to permit differentiation between reference signals.

Additionally, or alternatively, different reference signals may be transmitted using different types of sequences, such as Zadoff-Chu (ZC) sequences, pseudo-random number (PN) sequences, and/or the like. For example, a first reference signal may be transmitted using a first sequence selected from a first set of sequences having a first sequence type (e.g., ZC sequences), a second reference signal may be transmitted using a second sequence selected from a second set of sequences having a second sequence type (e.g., PN sequences), and so on. In this way, different reference signals from the same base station 110 may be distinguished from one another for proper interpretation.

Additionally, or alternatively, different reference signals may be transmitted using different cyclic shifts of the same type of sequence and/or using one or more other parameters to alter the sequences for differentiation (e.g., one or more input parameters used to generate a sequence). For example, the first reference signal may be transmitted using a first cyclic shift of a sequence, a second reference signal may be transmitted using a second (e.g., different) cyclic shift of the sequence, and so on. In this way, different reference signals from the same base station 110 may be distinguished from one another for proper interpretation.

As shown by reference number 625, the aggressor base station 605 may receive the reference signals for RIM (e.g., RS-1) from the victim base station 610, may determine a base station identifier of the victim base station 610 based at least in part on the one or more signal parameters used to transmit the one or more reference signals (e.g., the time periods, sequences, and/or the like), and may use the base station identifier to perform remote interference management (RIM). For example, as described above in connection with FIG. 5, the aggressor base station 605 may communicate with the victim base station 610 via a backhaul (e.g., including one or more wired connections, via a network controller, via a core network, and/or the like) to assist with remote interference management. The aggressor base station 605 may use the base station identifier of the victim base station 610 to direct backhaul communications to the victim base station 610.

Although the victim base station 610 is described above as transmitting two reference signals in two corresponding time periods, in some aspects, a different number of (e.g., more than two) reference signals may be transmitted in a corresponding number of time periods. For example, the victim base station 610 may transmit three reference signals in three corresponding time periods, may transmit four reference signals in four corresponding time periods, and/or the like, to assist with implicit identification of a base station identifier of the victim base station 610.

By allocating different sets of time periods to different sets of base stations 110 (e.g., a first set of two or more time periods to a first set of base stations 110, a second set of two or more time periods to a second set of base stations 110, and so on), a large number of base stations 110 may be uniquely identified over a time window that includes multiple sets of time periods. Furthermore, one or more techniques described in connection with FIG. 6 may be combined with one or more techniques to further increase the number of base stations 110 that can be uniquely identified, such as one or more techniques described in connection with FIG. 7 and/or elsewhere herein.

For example, different reference signals may be scrambled with different scrambling codes (e.g., selected from a pool of scrambling codes) to permit further differentiation (e.g., per time period), such as by descrambling the reference signal to obtain the scrambling code (e.g., a code identifier and/or the like), which may be used to identify at least a portion of the base station identifier and/or to reduce interference among reference signal sequences. In some aspects, a first scrambling code may be used to scramble a first reference signal, a second scrambling code may be used to scramble a second reference signal, and so on. In some aspects, the first scrambling code may be selected from a first pool of scrambling codes, the second scrambling code may be selected from a second pool of scrambling codes, and so on. In some aspects, different pools of scrambling codes may be mutually exclusive.

Additionally, or alternatively, multiple reference signals may be transmitted across multiple mini-bands, corresponding to multiple sub-bands in a frequency domain, in a single time window, as described in more detail below in connection with FIG. 7. This may permit differentiation between base stations 110, and may be used alone or in combination with one or more techniques described in connection with FIG. 6.

As indicated above, FIG. 6 is provided as an example. Other examples may differ from what was described with respect to FIG. 6.

Figure 7:
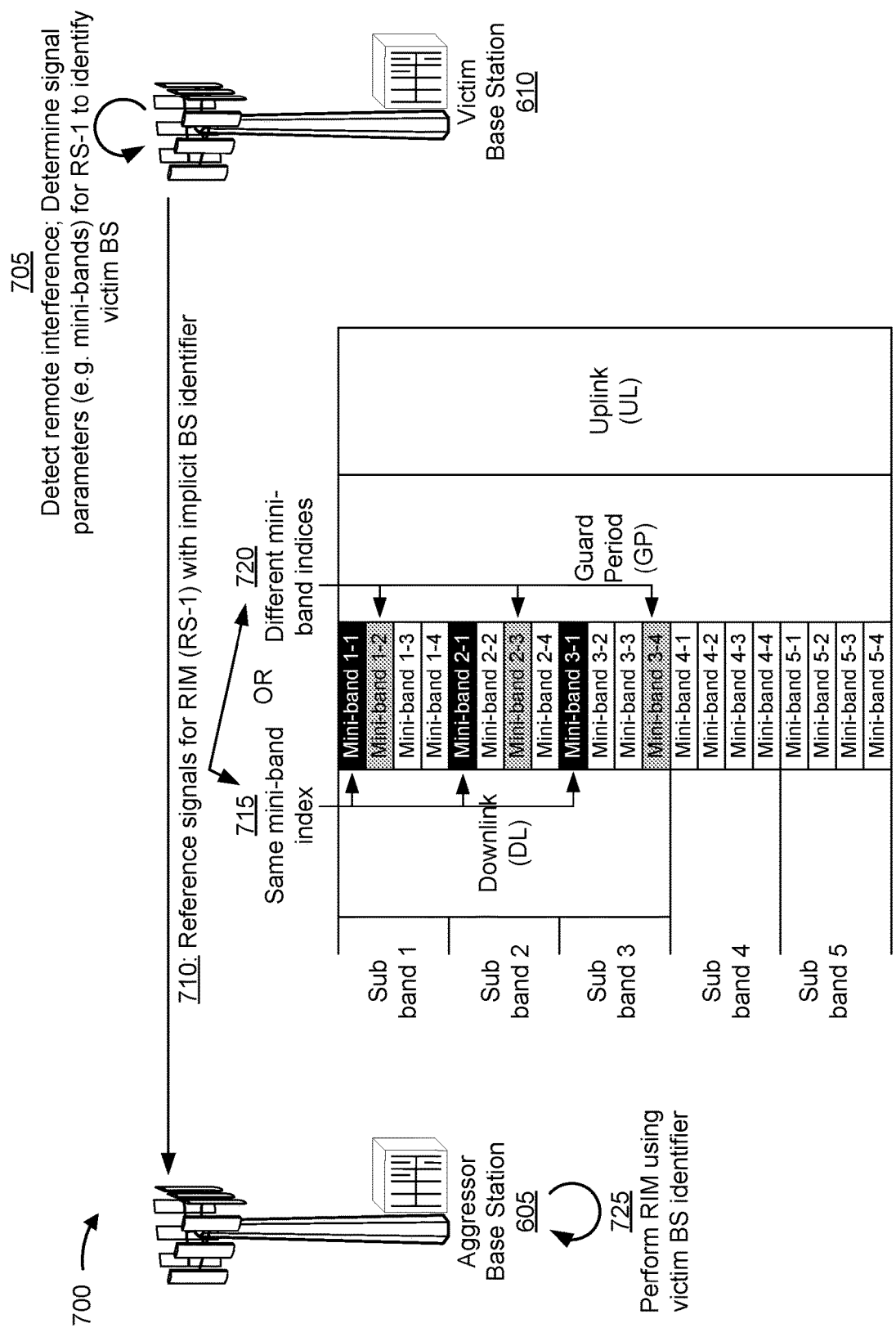

FIG. 7 is a diagram illustrating another example 700 of implicit base station identification for remote interference management, in accordance with various aspects of the present disclosure.

As shown in FIG. 7, example 700 may include an aggressor base station 605 and a victim base station 610. The aggressor base station 605 may cause remote interference at the victim base station 610, as described above in connection with FIG. 5. The aggressor base station 605 and/or the victim base station 610 may include a base station 110.

As shown by reference number 705, the victim base station 610 may detect remote interference, as described above in connection with FIG. 5. Based at least in part on detecting the remote interference, the victim base station 610 may transmit a reference signal for RIM, such as RS-1 and/or the like. The victim base station 610 may transmit the reference signal using one or more signal parameters to indicate (e.g., implicitly) a base station identifier of the victim base station 610. In some aspects, the victim base station 610 may determine the signal parameters based at least in part on a configuration of the victim base station 610 (e.g., a configuration received from a network controller 130, a device in a core network, and/or the like). In some aspects, the one or more signal parameters may include multiple mini-bands in which a single reference signal or multiple reference signals are to be transmitted for a time period.

For example, as shown by reference number 710, a plurality of reference signals may be transmitted in a corresponding plurality of mini-bands. As shown, a mini-band may be a portion of a sub-band, and a sub-band may include multiple mini-bands. In some aspects, each mini-band, in which a reference signal is transmitted, may be included in a different sub-band. In this way, robustness of reference signal communication for RIM may be enhanced in the frequency domain, such as by permitting channel conditions to be estimated for multiple sub-bands, by permitting a determination of whether remote interference exists in one or more of the sub-bands, permitting determination of a strength of the remote interference in different sub-bands, and/or the like.

In example 700, a system bandwidth (e.g., of 100 MHz) may be divided into multiple sub-bands (e.g., shown as 5 sub-bands of 20 MHz each). A sub-band may be divided into multiple mini-bands (e.g., shown as 4 mini-bands of 5 MHz each). The number of sub-bands and mini-bands shown in FIG. 7 are provided as an example, and other numbers of sub-bands and/or mini-bands may be used. In some aspects, the reference signals may be transmitted in one or more downlink sub-bands (e.g., to indicate uplink interference at the aggressor base station 605 due to remote interference). In some aspects, a sub-band and the first mini-band within the sub-band start at the same fixed frequency position, sometimes referred to as a raster, a frequency raster, and/or the like. Additionally, or alternatively, a sub-band and the last mini-band within the sub-band may end at the same fixed frequency position. In this way, detection complexity may be reduced by aligning (e.g., in the frequency domain) the sub-band the mini-bands included in the sub-band.

In some aspects, a mini-band may be identified using a mini-band identifier. The mini-band identifier may include, for example, a sub-band index, that identifies a sub-band that includes the mini-band, and a mini-band index that differentiates the mini-band from other mini-bands included in the same sub-band. For example, a mini-band identifier of 1-1 may be used to identify a first mini-band within a first sub-band, a mini-band identifier of 1-2 may be used to identify a second mini-band within the first sub-band, a mini-band identifier of 2-1 may be used to identify a first mini-band within a second sub-band, and so on.

As shown by reference number 715, in some aspects, a plurality of reference signals may be transmitted in a corresponding plurality of mini-bands, and each mini-band may have the same mini-band index and a different sub-band index. For example, the reference signals may be transmitted in mini-band 1-1, mini-band 2-1, and mini-band 3-1, as shown. In this case, the mini-band index may be used to convey information about the base station identifier (e.g., alone or in combination with other information, such as one or more time periods in which the reference signals are transmitted in the mini-bands, one or more sequences used to transmit the reference signals, one or more scrambling codes used to scramble the reference signals, and/or the like). For example, the mini-band index may identify at least a portion of the base station identifier (e.g., some or all of the base station identifier). In example 700, the mini-band index conveys 2 bits of information (e.g., for 4 possible mini-bands within a sub-band). However, in some aspects, a different number of bits may be included in the mini-band index, such as 1 bit, 3 bits, and/or the like.

As shown by reference number 720, in some aspects, a plurality of reference signals may be transmitted in a corresponding plurality of mini-bands, and each mini-band may have a different mini-band index (e.g., and a different sub-band index in the case where a single reference signal is transmitted per sub-band). Additionally, or alternatively, two or more of the plurality of mini-bands may have a different mini-band index. For example, some mini-bands may have the same mini-band index in different sub-bands, and some mini-bands may have different mini-band indices in different sub-bands. For example, the reference signals may be transmitted in mini-band 1-2, mini-band 2-3, and mini-band 3-4, as shown. In this case, a combination of the mini-band indices may be used to convey information about the base station identifier (e.g., alone or in combination with other information, such as one or more time periods in which the reference signals are transmitted in the mini-bands, one or more sequences used to transmit the reference signals, one or more scrambling codes used to scramble the reference signals, and/or the like). For example, a combination of the mini-band indices may identify at least a portion of the base station identifier (e.g., some or all of the base station identifier). In example 700, the combination of the mini-band indices conveys 6 bits of information (e.g., 2 bits for each of the 3 mini-bands in the different sub-bands). However, in some aspects, a different number of bits may be included in the mini-band index, such as 1 bit, 3 bits, and/or the like, which may convey a different amount of information (e.g., 3 bits, 9 bits, and/or the like).

As shown by reference number 725, the aggressor base station 605 may receive the reference signals for RIM (e.g., RS-1) from the victim base station 610, may determine a base station identifier of the victim base station 610 based at least in part on the one or more signal parameters used to transmit the one or more reference signals (e.g., the mini-bands, time periods, sequences, and/or the like), and may use the base station identifier to perform remote interference management (RIM). For example, as described above in connection with FIG. 5, the aggressor base station 605 may communicate with the victim base station 610 via a backhaul to assist with remote interference management. The aggressor base station 605 may use the base station identifier of the victim base station 610 to direct backhaul communications to the victim base station 610.

By allocating different mini-bands and/or different combinations of mini-bands to different sets of base stations 110 (e.g., a first set of mini-bands to a first set of base stations 110, a second set of mini-bands to a second set of base stations 110, and so on), a large number of base stations 110 may be uniquely identified. Furthermore, one or more techniques described in connection with FIG. 7 may be combined with one or more techniques to further increase the number of base stations 110 that can be uniquely identified, such as one or more techniques described in connection with FIG. 6 and/or elsewhere herein.

For example, different reference signals may be scrambled with different scrambling codes to permit further differentiation, as described above in connection with FIG. 6. Additionally, or alternatively, multiple reference signals may be transmitted across multiple time-periods, as described in more detail above in connection with FIG. 6. This may permit differentiation between base stations 110, and may be used alone or in combination with one or more techniques described in connection with FIG. 7.

For example, example 700 shows transmission of multiple reference signals in multiple mini-bands for a single time period. In some aspects, reference signals may be transmitted in multiple mini-bands in each of a plurality of time periods. In some aspects, the same combination of mini-band indices used for a first time period may also be used in a second time period (and/or a third time period, and so on). In some aspects, a different combination of mini-band indices may be used to transmit reference signals in different time periods. In this case, a larger amount of information may be conveyed, such as by using a combination of mini-band indices across multiple time periods to convey information about the base station identifier.

Although techniques are described herein in association with a victim base station 610 indicating a base station identifier for the victim base station 610 using one or more signal parameters of a reference signal (e.g., RS-1), these techniques may also be applied to an aggressor base station 605 indicating a base station identifier for the aggressor base station 605 using one or more signal parameters of a reference signal (e.g., RS-2). In some aspects, the base station that is transmitting a reference signal for RIM (e.g., which may be the victim base station 610, the aggressor base station 605, and/or the like) may be referred to as a transmitting base station (e.g., a transmitting base station 110). Similarly, the base station that is receiving a reference signal for RIM (e.g., which may be the victim base station 610, the aggressor base station 605, and/or the like) may be referred to as a receiving base station (e.g., a receiving base station 110).

As indicated above, FIG. 7 is provided as an example. Other examples may differ from what was described with respect to FIG. 7.

Figure 8:
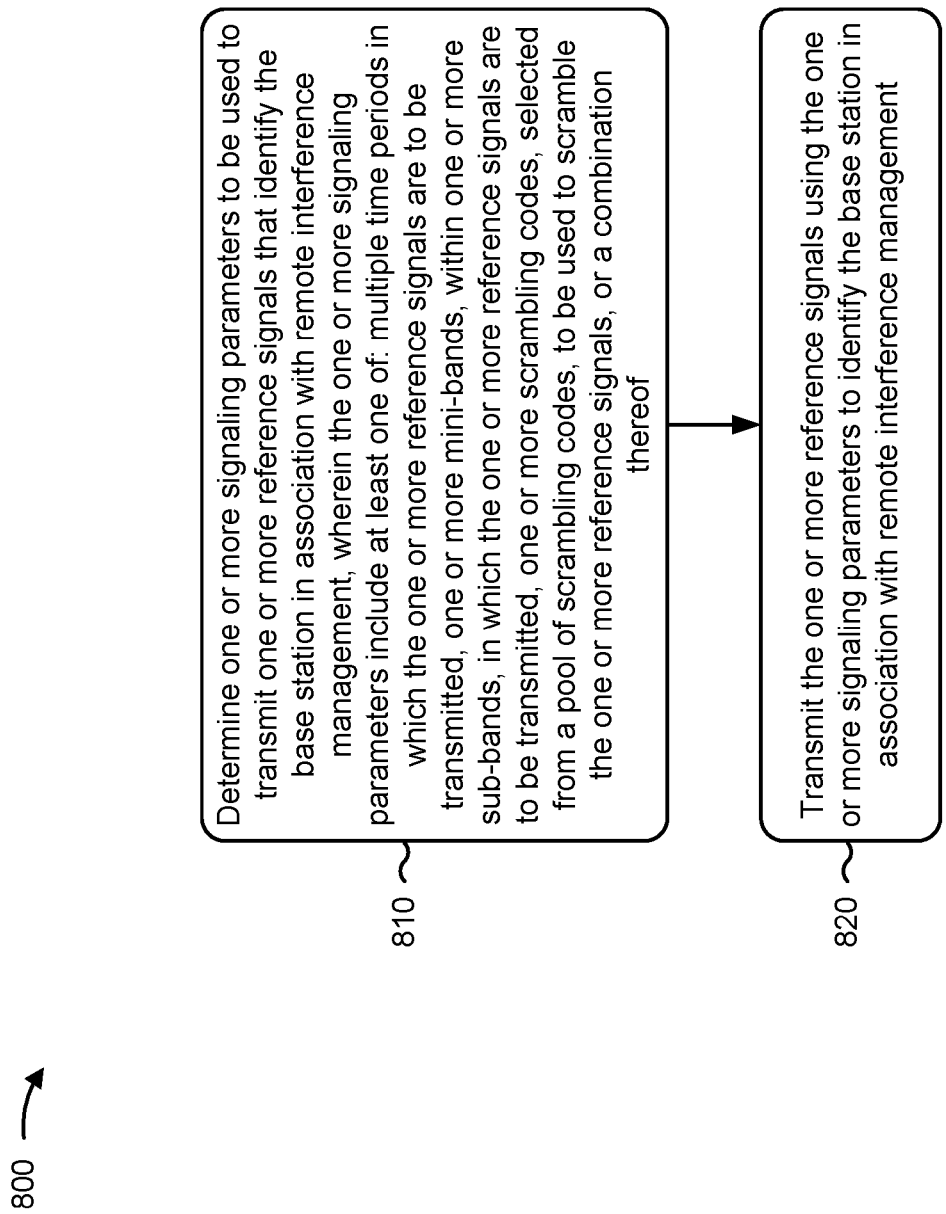
FIGS. 8-9 are diagrams illustrating example processes relating to implicit base station identification for remote interference management, in accordance with various aspects of the present disclosure.

FIG. 8 is a diagram illustrating an example process 800 performed, for example, by a base station, in accordance with various aspects of the present disclosure. Example process 800 is an example where a base station (e.g., base station 110, aggressor base station 605, victim base station 610, and/or the like) performs operations associated with implicit base station identification for remote interference management.

As shown in FIG. 8, in some aspects, process 800 may include determining one or more signaling parameters to be used to transmit one or more reference signals that identify the base station in association with remote interference management, wherein the one or more signaling parameters include at least one of: multiple time periods in which the one or more reference signals are to be transmitted, one or more mini-bands, within one or more sub-bands, in which the one or more reference signals are to be transmitted, one or more scrambling codes, selected from a pool of scrambling codes, to be used to scramble the one or more reference signals, or a combination thereof (block 810). For example, the base station (e.g., using controller/processor 240 and/or the like) may determine one or more signaling parameters to be used to transmit one or more reference signals that identify the base station in association with remote interference management, as described above. In some aspects, the one or more signaling parameters include at least one of: multiple time periods in which the one or more reference signals are to be transmitted; one or more mini-bands, within one or more sub-bands, in which the one or more reference signals are to be transmitted; one or more scrambling codes, selected from a pool of scrambling codes, to be used to scramble the one or more reference signals; or a combination thereof.

As shown in FIG. 8, in some aspects, process 800 may include transmitting the one or more reference signals using the one or more signaling parameters to identify the base station in association with remote interference management (block 820). For example, the base station (e.g., using controller/processor 240, transmit processor 220, TX MIMO processor 230, MOD 232, antenna 234, and/or the like) may transmit the one or more reference signals using the one or more signaling parameters to identify the base station in association with remote interference management, as described above.

Process 800 may include additional aspects, such as any single aspect or any combination of aspects described below and/or in connection with one or more other processes described elsewhere herein.

In a first aspect, the one or more reference signals include multiple reference signals corresponding to the multiple time periods.

In a second aspect, alone or in combination with the first aspect, each reference signal, of the multiple reference signals, is transmitted in a different time period of the multiple time periods.

In a third aspect, alone or in combination with one or more of the first and second aspects, the multiple time periods include multiple slots, multiple mini-slots, multiple sets of symbols, multiple subframes, or multiple frames.

In a fourth aspect, alone or in combination with one or more of the first through third aspects, the one or more reference signals include a first reference signal transmitted in a first time period, of the multiple time periods, and a second reference signal transmitted in a second time period of the multiple time periods.

In a fifth aspect, alone or in combination with one or more of the first through fourth aspects, the first reference signal is transmitted using a first sequence selected from a first set of sequences, and the second reference signal is transmitted using a second sequence selected from a second set of sequences.

In a sixth aspect, alone or in combination with one or more of the first through fifth aspects, the first set of sequences and the second set of sequences are mutually exclusive.

In a seventh aspect, alone or in combination with one or more of the first through sixth aspects, the first reference signal is transmitted using a first type of sequence, and the second reference signal is transmitted using a second type of sequence.

In an eighth aspect, alone or in combination with one or more of the first through seventh aspects, the first reference signal is transmitted using a first cyclic shift of a sequence, and the second reference signal is transmitted using a second cyclic shift of the sequence.

In a ninth aspect, alone or in combination with one or more of the first through eighth aspects, the one or more references signals include more than two reference signals transmitted in a corresponding more than two time periods of the multiple time periods.

In a tenth aspect, alone or in combination with one or more of the first through ninth aspects, the one or more reference signals include a plurality of reference signals transmitted in a corresponding plurality of mini-bands, wherein each of the plurality of mini-bands is included in a different sub-band.

In an eleventh aspect, alone or in combination with one or more of the first through tenth aspects, each mini-band, of the plurality of mini-bands, has a same mini-band index and a different sub-band index.

In a twelfth aspect, alone or in combination with one or more of the first through eleventh aspects, the mini-band index identifies at least a portion of a base station identifier of the base station.

In a thirteenth aspect, alone or in combination with one or more of the first through twelfth aspects, at least two mini-bands, of the plurality of mini-bands, have different mini-band indices and different sub-band indices.

In a fourteenth aspect, alone or in combination with one or more of the first through thirteenth aspects, a combination of the different mini-band indices identifies at least a portion of a base station identifier of the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
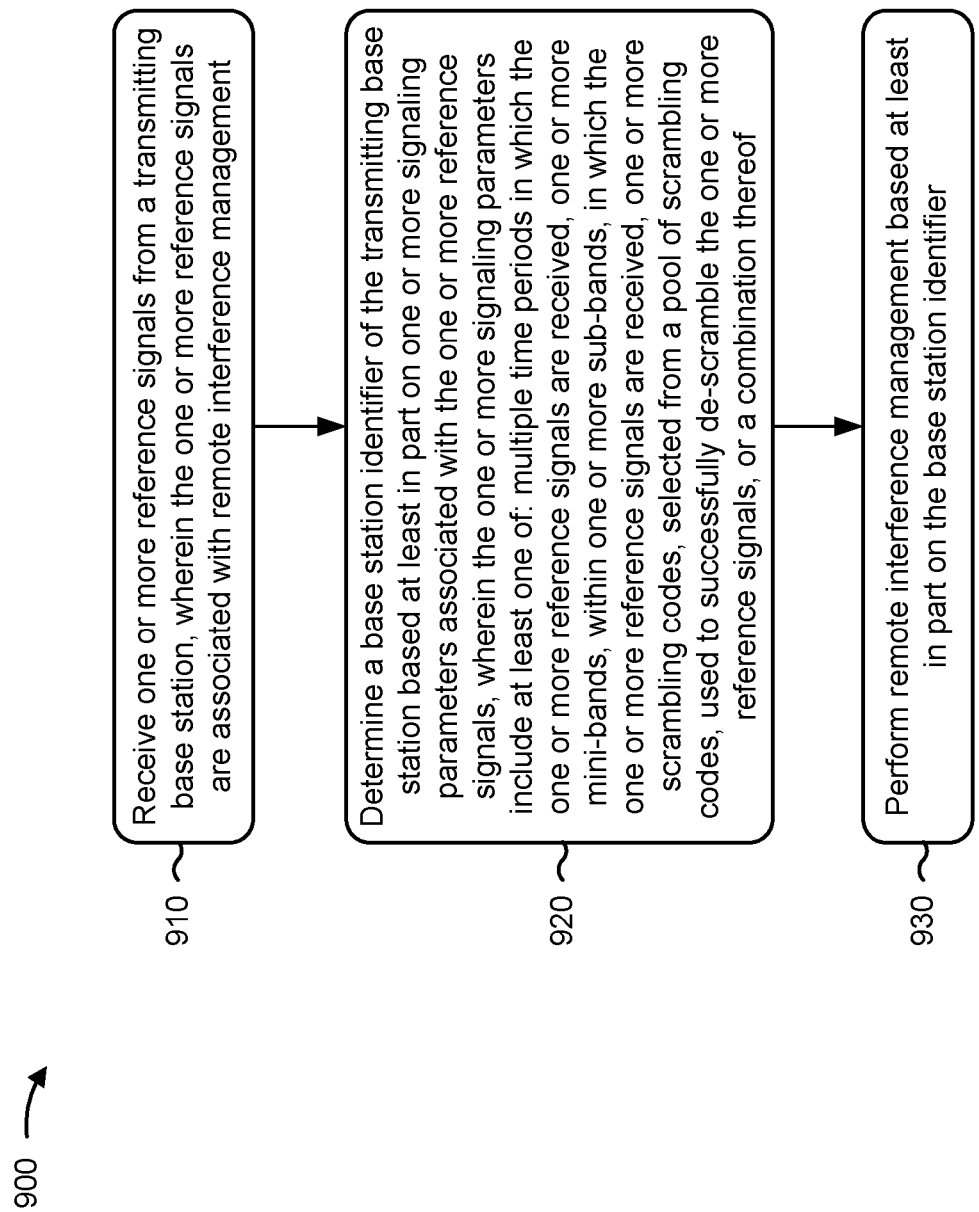

FIG. 9 is a diagram illustrating an example process 900 performed, for example, by a base station, in accordance with various aspects of the present disclosure. Example process 900 is an example where a base station (e.g., base station 110, aggressor base station 605, victim base station 610, and/or the like) performs operations associated with implicit base station identification for remote interference management.

As shown in FIG. 9, in some aspects, process 900 may include receiving one or more reference signals from a transmitting base station, wherein the one or more reference signals are associated with remote interference management (block 910). For example, the base station (e.g., using antenna 234, DEMOD 232, MIMO detector 236, receive processor 238, controller/processor 240, and/or the like) may receive one or more reference signals from a transmitting base station, as described above. In some aspects, the one or more reference signals are associated with remote interference management.

As shown in FIG. 9, in some aspects, process 900 may include determining a base station identifier of the transmitting base station based at least in part on one or more signaling parameters associated with the one or more reference signals, wherein the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof (block 920). For example, the base station (e.g., using controller/processor 240 and/or the like) may determine a base station identifier of the transmitting base station based at least in part on one or more signaling parameters associated with the one or more reference signals, as described above. In some aspects, the one or more signaling parameters include at least one of: multiple time periods in which the one or more reference signals are received, one or more mini-bands, within one or more sub-bands, in which the one or more reference signals are received, one or more scrambling codes, selected from a pool of scrambling codes, used to successfully de-scramble the one or more reference signals, or a combination thereof.

As shown in FIG. 9, in some aspects, process 900 may include performing remote interference management based at least in part on the base station identifier (block 930). For example, the base station (e.g., using controller/processor 240, transmit processor 220, TX MIMO processor 230, MOD 232, antenna 234, and/or the like) may perform remote interference management based at least in part on the base station identifier, as described above.

Process 900 may include additional aspects, such as any single aspect or any combination of aspects described below and/or in connection with one or more other processes described elsewhere herein.

In a first aspect, performing the remote interference management includes communicating with the transmitting base station based at least in part on determining the base station identifier of the transmitting base station.

In a second aspect, alone or in combination with the first aspect, the one or more reference signals include multiple reference signals corresponding to the multiple time periods.

In a third aspect, alone or in combination with one or more of the first and second aspects, each reference signal, of the multiple reference signals, is received in a different time period of the multiple time periods.

In a fourth aspect, alone or in combination with one or more of the first through third aspects, the multiple time periods include multiple slots, multiple mini-slots, multiple sets of symbols, multiple subframes, or multiple frames.

In a fifth aspect, alone or in combination with one or more of the first through fourth aspects, the one or more reference signals include a first reference signal received in a first time period, of the multiple time periods, and a second reference signal received in a second time period of the multiple time periods.

In a sixth aspect, alone or in combination with one or more of the first through fifth aspects, the first reference signal is received using a first sequence selected from a first set of sequences, and the second reference signal is received using a second sequence selected from a second set of sequences.

In a seventh aspect, alone or in combination with one or more of the first through sixth aspects, the first set of sequences and the second set of sequences are mutually exclusive.

In an eighth aspect, alone or in combination with one or more of the first through seventh aspects, the first reference signal is received using a first type of sequence, and the second reference signal is received using a second type of sequence.

In a ninth aspect, alone or in combination with one or more of the first through eighth aspects, the first reference signal is received using a first cyclic shift of a sequence, and the second reference signal is transmitted using a second cyclic shift of the sequence.

In a tenth aspect, alone or in combination with one or more of the first through ninth aspects, the one or more references signals include more than two reference signals received in a corresponding more than two time periods of the multiple time periods.

In an eleventh aspect, alone or in combination with one or more of the first through tenth aspects, the one or more reference signals include a plurality of reference signals received in a corresponding plurality of mini-bands, wherein each of the plurality of mini-bands is included in a different sub-band.

In a twelfth aspect, alone or in combination with one or more of the first through eleventh aspects, each mini-band, of the plurality of mini-bands, has a same mini-band index and a different sub-band index.

In a thirteenth aspect, alone or in combination with one or more of the first through twelfth aspects, the mini-band index identifies at least a portion of a base station identifier of the base station.

In a fourteenth aspect, alone or in combination with one or more of the first through thirteenth aspects, at least two mini-bands, of the plurality of mini-bands, have different mini-band indices and different sub-band indices.

In a fifteenth aspect, alone or in combination with one or more of the first through fourteenth aspects, a combination of the different mini-band indices identifies at least a portion of a base station identifier of the base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
    determining one or more signaling parameters to be used to transmit a plurality of reference signals that identify the base station in association with remote interference management, wherein the one or more signaling parameters include:
        multiple time periods in which the plurality of reference signals are to be transmitted, and
        a plurality of mini-bands, within one or more sub-bands, in which the plurality of reference signals are to be transmitted,
            wherein each mini-band, of the plurality of mini-bands, has a same mini-band index and a different sub-band index, and
            wherein the multiple time periods include multiple slots, multiple mini-slots, multiple sets of symbols, multiple subframes, or multiple frames; and
    transmitting the plurality of reference signals using the one or more signaling parameters to identify the base station in association with remote interference management.

2. The method of claim 1, wherein each reference signal, of the plurality of reference signals, is transmitted in a different time period of the multiple time periods.

3. The method of claim 1, wherein the plurality of reference signals include a first reference signal transmitted in a first time period, of the multiple time periods, and a second reference signal transmitted in a second time period of the multiple time periods.

4. The method of claim 3, wherein the first reference signal is transmitted using a first sequence selected from a first set of sequences, and
    wherein the second reference signal is transmitted using a second sequence selected from a second set of sequences.

5. The method of claim 4, wherein the first set of sequences and the second set of sequences are mutually exclusive.

6. The method of claim 3, wherein the first reference signal is transmitted using a first type of sequence, and
    wherein the second reference signal is transmitted using a second type of sequence.

7. The method of claim 3, wherein the first reference signal is transmitted using a first cyclic shift of a sequence, and
    wherein the second reference signal is transmitted using a second cyclic shift of the sequence.

8. The method of claim 1, wherein the plurality of references signals include more than two reference signals transmitted in a corresponding more than two time periods of the multiple time periods.

9. The method of claim 1, wherein each mini-band, of the corresponding plurality of mini-bands, is included in a different sub-band.

10. The method of claim 1, wherein the mini-band index identifies at least a portion of a base station identifier of the base station.

11. The method of claim 9, wherein at least two mini-bands, of the plurality of mini-bands, have different mini-band indices and different sub-band indices.

12. The method of claim 11, wherein a combination of the different mini-band indices identifies at least a portion of a base station identifier of the base station.

13. A method of wireless communication performed by a receiving base station, comprising:
    receiving a plurality of reference signals from a transmitting base station, wherein the plurality of reference signals are associated with remote interference management;
    determining a base station identifier of the transmitting base station based at least in part on one or more signaling parameters associated with the plurality of reference signals, wherein the one or more signaling parameters include:
        multiple time periods in which the one or more plurality of reference signals are to be transmitted, and
        a plurality of mini-bands, within one or more sub-bands, in which the plurality of reference signals are received,
            wherein each mini-band, of the plurality of mini-bands, has a same mini-band index and a different sub-band index, and
            wherein the multiple time periods include multiple slots, multiple mini-slots, multiple sets of symbols, multiple subframes, or multiple frames; and
    performing remote interference management based at least in part on the base station identifier.

14. The method of claim 13, wherein performing the remote interference management includes communicating with the transmitting base station based at least in part on determining the base station identifier of the transmitting base station.

15. The method of claim 13, wherein each reference signal, of the plurality of reference signals, is received in a different time period of the multiple time periods.

16. The method of claim 13, wherein the plurality of reference signals include a first reference signal received in a first time period, of the multiple time periods, and a second reference signal received in a second time period of the multiple time periods.

17. The method of claim 16, wherein the first reference signal is received using a first sequence selected from a first set of sequences, and
    wherein the second reference signal is received using a second sequence selected from a second set of sequences.

18. The method of claim 17, wherein the first set of sequences and the second set of sequences are mutually exclusive.

19. The method of claim 16, wherein:
    the first reference signal is received using a first type of sequence and the second reference signal is received using a second type of sequence, or the first reference signal is received using a first cyclic shift of a sequence and the second reference signal is transmitted using a second cyclic shift of the sequence.

20. The method of claim 13, wherein the plurality of references signals include more than two reference signals received in a corresponding more than two time periods of the multiple time periods.

21. The method of claim 13, wherein each mini-band, of the plurality of mini-bands, is included in a different sub-band.

22. The method of claim 13, wherein the mini-band index identifies at least a portion of a base station identifier of the receiving base station.

23. The method of claim 21, wherein at least two mini-bands, of the plurality of mini-bands, have different mini-band indices and different sub-band indices.

24. The method of claim 23, wherein a combination of the different mini-band indices identifies at least a portion of a base station identifier of the receiving base station.

25. A base station for wireless communication, comprising:
one or more memories; and
one or more processors coupled to the one or more memories, the one or more processors configured to:
determine one or more signaling parameters to be used to transmit a plurality of reference signals that identify the base station in association with remote interference management, wherein the one or more signaling parameters include:
multiple time periods in which the plurality of reference signals are to be transmitted, and
a plurality of mini-bands, within one or more sub-bands, in which the plurality of reference signals are to be transmitted,
wherein each mini-band, of the plurality of mini-bands, has a same mini-band index and a different sub-band index, and
wherein the multiple time periods include multiple slots, multiple mini-slots, multiple sets of symbols, multiple subframes, or multiple frames; and
transmit the plurality of reference signals using the one or more signaling parameters to identify the base station in association with remote interference management.

26. A receiving base station for wireless communication, comprising:
one or more memories; and
one or more processors coupled to the one or more memories, the one or more processors configured to:
receive a plurality of reference signals from a transmitting base station, wherein the plurality of reference signals are associated with remote interference management;
determine a base station identifier of the transmitting base station based at least in part on one or more signaling parameters associated with the plurality of reference signals, wherein the one or more signaling parameters include:
multiple time periods in which the plurality of reference signals are to be transmitted, and
a plurality of mini-bands, within one or more sub-bands, in which the one or more plurality of reference signals are to be transmitted,
wherein each mini-band, of the plurality of mini-bands, is included in a different sub-band, and
wherein the multiple time periods include multiple slots, multiple mini-slots, multiple sets of symbols, multiple subframes, or multiple frames; and
perform remote interference management based at least in part on the base station identifier.

27. The base station of claim 25, wherein each reference signal, of the plurality of reference signals, is transmitted in a different time period of the multiple time periods.

28. The receiving base station of claim 26, wherein each reference signal, of the plurality of reference signals, is transmitted in a different time period of the multiple time periods.

29. The receiving base station of claim 26, wherein each mini-band, of the plurality of mini-bands, is included in a different sub-band.

30. The base station of claim 25, wherein each mini-band, of the plurality of mini-bands, is included in a different sub-band.

* * * * *